(12) United States Patent
Bodo et al.

(10) Patent No.: US 11,526,903 B2
(45) Date of Patent: Dec. 13, 2022

(54) DONATION OF LOYALTY POINTS BASED ON DONATION PROFILES

(71) Applicant: MASTERCARD INTERNATIONAL INCORPORATED, Purchase, NY (US)

(72) Inventors: Loralee Bodo, Mount Kisco, NY (US); Jennifer Huffman, Scarsdale, NY (US); Jason Hilliard Goodgold, Waxhaw, NC (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/739,862

(22) Filed: Jan. 10, 2020

(65) Prior Publication Data
US 2021/0217042 A1   Jul. 15, 2021

(51) Int. Cl.
*G06Q 30/00* (2012.01)
*G06Q 30/02* (2012.01)

(52) U.S. Cl.
CPC ..... *G06Q 30/0226* (2013.01); *G06Q 30/0279* (2013.01)

(58) Field of Classification Search
CPC ....................................... G06Q 30/0207–0277
See application file for complete search history.

(56) References Cited

U.S. PATENT DOCUMENTS

| | | | |
|---|---|---|---|
| 8,473,380 B2 | 6/2013 | Thomas et al. | |
| 2005/0021353 A1* | 1/2005 | Aviles | G06Q 30/0279 705/34 |
| 2006/0010033 A1 | 1/2006 | Thomas | |
| 2009/0287563 A1 | 11/2009 | Mone et al. | |
| 2012/0023025 A1* | 1/2012 | Lin | G06Q 20/401 705/75 |
| 2012/0232980 A1 | 9/2012 | Wald et al. | |
| 2013/0054327 A1 | 2/2013 | Ross et al. | |
| 2013/0151433 A1 | 6/2013 | Hicks et al. | |
| 2014/0229397 A1 | 8/2014 | Fink | |

(Continued)

OTHER PUBLICATIONS

Information on GoFundMe, 2018, www.GoFundMe.com, archived webpages printed through www.archive.org (Year: 2018).*

(Continued)

*Primary Examiner* — Naresh Vig

(57) ABSTRACT

The disclosure herein describes enabling a donor to donate loyalty points associated with a loyalty program to a receiver based on a donation profile. The donation profile is hosted by a loyalty points donation platform (LPDP) and includes a donation entry including a loyalty point type and a requested quantity. A donation request including a loyalty account identifier, credential data of the loyalty account, and a point donation quantity is received. Approval of the donation request is requested from the donor loyalty program including providing the loyalty account identifier and the credential data to the donor loyalty program. Based on receiving approval from the donor loyalty program, the donor loyalty program is instructed to transfer a quantity of loyalty points indicated by the point donation quantity from the loyalty account associated with the loyalty account identifier to a receiver loyalty account associated with the donation profile of the receiver.

20 Claims, 8 Drawing Sheets

(56) References Cited

U.S. PATENT DOCUMENTS

| | | | |
|---|---|---|---|
| 2015/0006244 A1 | 1/2015 | Tietzen | |
| 2015/0161614 A1* | 6/2015 | Tsing | G06Q 30/0279 |
| | | | 705/12 |
| 2015/0170226 A1 | 6/2015 | Higgins et al. | |
| 2016/0071140 A1 | 3/2016 | Sherman | |
| 2016/0343031 A1 | 11/2016 | Kandibur | |
| 2017/0352065 A1* | 12/2017 | Lewis | G06Q 30/0279 |
| 2018/0322543 A1* | 11/2018 | Graybill | G06Q 20/10 |
| 2020/0402117 A1* | 12/2020 | Givens | G06Q 10/1093 |

OTHER PUBLICATIONS

Cyrielle G. published article, What happens if a project does not reach its funding goal, Sep. 17, 2018, KissKissBankBank.com (Year: 2018).*

Helena Vieira, A quality certificate increases trust and donations to a charity, Sep. 8, 2017, blogs.lse.ac.uk (Year: 2017).*

Lauren McMenemy, The benefits of having eSignature in your entity management software, Oct. 25, 2019, insights.diligent.com (Year: 2019).*

Ronda Swaney, 5 reasons to use e-signature in your business, Nov. 19, 2019, insights.Samsung.com (Year: 2019).*

Rahim Kaba, Enable Digital Account Openings with ID verification and E-Signature, Aug. 13, 2018, www.onespan.com (Year: 2018).*

V. Mitchell, "New Platform Enables Donation of Unused Customer Loyalty Points to Charity", Digital Marketing, Feb. 8, 2018, https://www.cmo.com.au/article/633152/new-platform-enables-donation-unused-customer-loyalty-points-charity/, 6 pages.

K. Wu, "A Moving Target: The Regulation of Online Fundraising Platforms", The NonProfit Times, Mar. 13, 2015, 13 pages.

* cited by examiner

DONATION OF LOYALTY POINTS BASED ON DONATION PROFILES

BACKGROUND

Loyalty programs, such as airline miles programs or programs that enable users to earn points for hotel or resort stays, have become a common feature used to incentivize consumers to use particular credit cards or accounts when making purchases. While some users make good use of the loyalty points they earn, in many cases, the loyalty points go unused or expire before they are used. Current loyalty programs do not generally offer ways of transferring or otherwise sharing loyalty points between users without requiring payment of fees or penalties.

Additionally, people with disabilities or otherwise in need of medical treatment often incur substantial travel costs, including but not limited to airfare costs, hotel stay costs, and/or car rental or rideshare costs when traveling to locations where they will receive the medical treatment they need. Those in need of such treatment would benefit from a reduction in travel costs associated with the treatment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for enabling a donor to donate loyalty points associated with a loyalty program to a receiver based on a donation profile of the receiver is described. The donation profile of the receiver is hosted by a processor of a loyalty points donation platform (LPDP), wherein the donation profile includes at least one donation entry including a loyalty point type and a requested quantity, wherein the at least one donation entry has been approved by at least one loyalty program associated with the loyalty point type. A donation request to donate loyalty points to the hosted donation profile of the receiver from the donor is received, by the processor, the donation request including at least a loyalty account identifier of a loyalty account of the donor, credential data associated with the loyalty account, and a point donation quantity indicating a quantity of loyalty points to be donated to the receiver, wherein the loyalty account is associated with a donor loyalty program of the at least one loyalty program associated with the loyalty point type. Approval of the donation request is requested, by the processor, from the donor loyalty program, the requesting including providing the loyalty account identifier and the credential data to the donor loyalty program. Based on receiving approval of the donation request from the donor loyalty program, the donor loyalty program is instructed by the processor to transfer a quantity of loyalty points indicated by the point donation quantity from the loyalty account associated with the loyalty account identifier to a receiver loyalty account associated with the donation profile of the receiver.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Aspects of the disclosure provide a computerized method and system for enabling a donor to donate loyalty points associated with a loyalty program to a receiver based on a donation profile of the receiver. The donation profile of the receiver is hosted by a processor of a loyalty points donation platform (LPDP). The donation profile includes a donation entry including a loyalty point type that has been approved by at least one loyalty program associated with the loyalty point type. A donation request to the hosted donation profile of the receiver from the donor is received and approval of the donation request is requested from the donor loyalty program. Based on receiving approval of the donation request from the donor loyalty program, the donor loyalty program is instructed by the LPDP to transfer a quantity of loyalty points indicated by the donation request from the donor loyalty account to a receiver loyalty account associated with the donation profile.

The disclosure addresses the challenges of enabling donors with loyalty points to donate those loyalty points to specific receivers that are in need of loyalty points for specific purposes. Such challenges include working with merchants and other entities that manage loyalty point programs to facilitate the transfer of points between loyalty accounts. By providing a trusted platform through which receivers are enabled to create donation profiles which can then be approved by the platform and loyalty programs, managers of loyalty programs are encouraged to complete the requested donation transfers and donors are enabled to find donation profiles and make donations via a user-friendly interface. The disclosure operates in an unconventional way at least by leveraging relationships and application program interfaces (APIs) between the LPDP and the loyalty platforms to enable the transfer of loyalty points between loyalty accounts and to provide checks, such as requiring confirmation or consent from a medical professional, to reduce and/or eliminate fraudulent use of the system. Further, the disclosure provides users with a comprehensive user interface for creating and configuring donation profiles that are hosted on the platform after approval by the loyalty programs and a donor user interface for enabling donors to make donations to donation profiles in a streamlined, user-friendly way.

Figure 1:
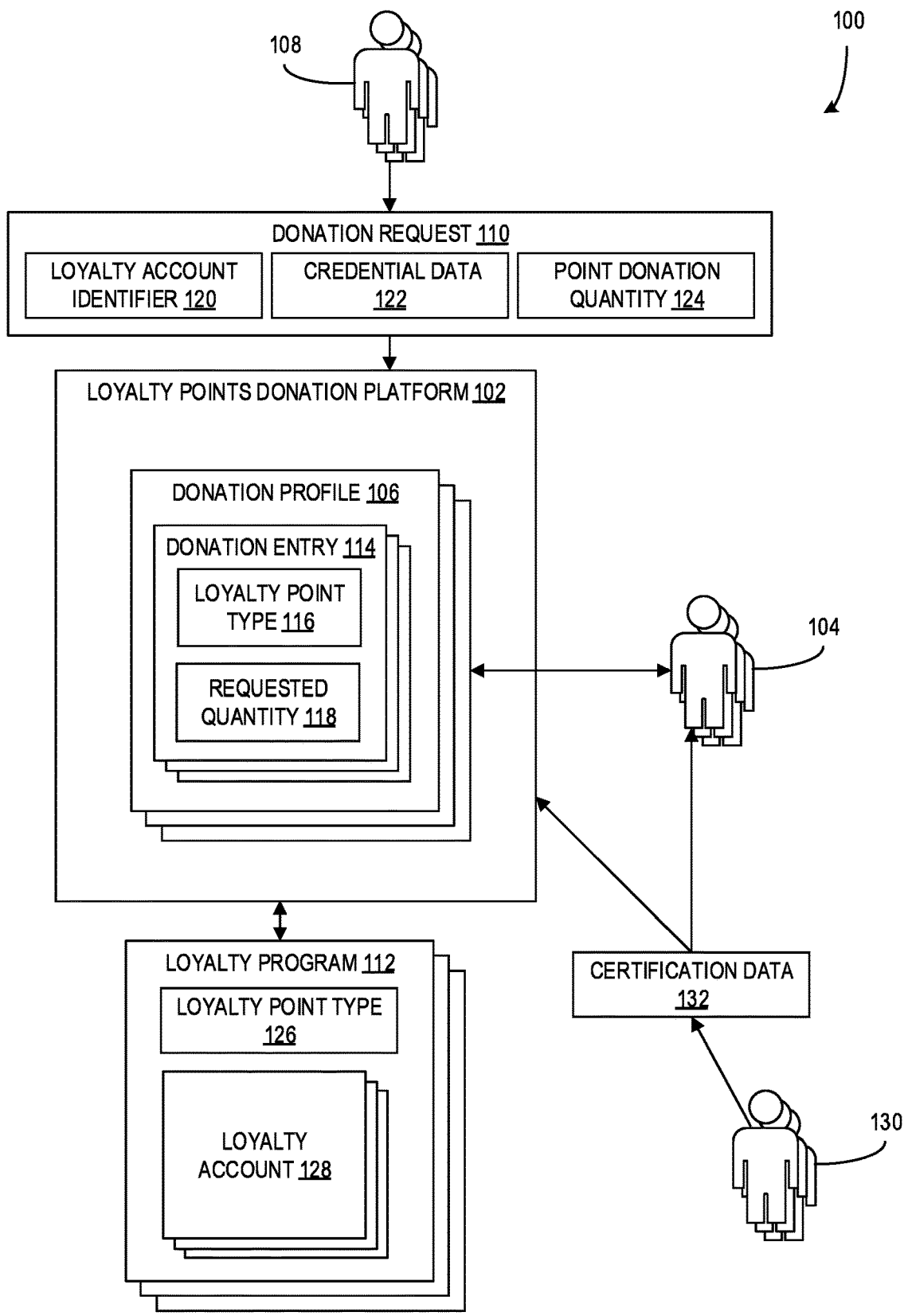
FIG. 1 is a block diagram illustrating a system configured for enabling a donor to donate loyalty points to a receiver according to an embodiment.

FIG. 1 is a block diagram illustrating a system 100 configured for enabling a donor 108 to donate loyalty points to a receiver 104 according to an embodiment. The system 100 includes an LPDP 102 that enables receivers 104 to set up donation profiles 106, enables donors 108 to register and send donation requests 110 to donate to the donation profiles 106, and interacts with loyalty programs 112 to facilitate the transfer of loyalty points based on donations made to the donation profiles 106. In some examples, the LPDP 102 is provided and/or managed by a payment network (e.g., MASTERCARD) that leverages existing lines of communication with banks, merchants, other financial entities, and/or other technology entities that offer, manage, and/or are associated with the loyalty programs 112 to establish secure, trusted loyalty point donation interfaces (e.g., application program interfaces (APIs)) from the LPDP 102 to the loyalty programs 112 to enable loyalty point donations as described herein. Further, in other examples, the LPDP 102 as described herein may be independent from payment network entities and/or associated with an entity other than a payment network without departing from the description herein.

The LPDP 102 includes hardware, firmware, and/or software configured to enable receivers 104 to run loyalty point donation campaigns by setting up and managing donation profiles 106. In some examples, each donation profile 106 is associated with one receiver 104 and a particular cause for which the receiver 104 is requesting donations. For instance, a receiver 104 may create a donation profile 106 that is associated with some expenses associated with the receiver 104 or a family member traveling to and staying in another city to receive medical treatment, such as cancer treatment or a surgery. Many loyalty programs offer loyalty points that can be used for various types of travel expenses and are well-suited for covering the receiver's hotel expenses, flight expenses, car rental or ride share expenses, food expenses, and/or other travel expenses when donated to the receiver's donation profile 106.

A donation profile 106 includes one or more donation entries 114, which represent requests for loyalty points of a specific loyalty point type 116 (e.g., air travel points or hotel points) in a specific requested quantity 118. A donation entry 114 may further include information describing the expenses that the requested loyalty points will cover (e.g., the receiver 104 needs hotel loyalty points to cover a five-night stay near Hospital X in City Y). Each donation profile 106 may include multiple donation entries 114 and each donation entry 114 may be associated with different, specific expenses associated with the cause of the donation profile 106 (e.g., an entry to cover a plane ticket to a city, an entry to cover a hotel stay in the city, and an entry to cover a return plane ticket from the city, etc.).

In some examples, a donation profile 106 and associated donation entries 114 are associated with loyalty programs 112 during setup of the donation profile 106. The receiver 104 is enabled to select from participating loyalty programs 112 that offer loyalty points of a loyalty point type 126 that matches the loyalty point types 116 of the donation entries 114 of the donation profile 106. Additionally, the receiver 104 may create or otherwise identify loyalty accounts 128 associated with the selected loyalty programs 112 that are to be used to receive and store donated loyalty points of those loyalty programs 112 (e.g., the receiver 104 provides a loyalty account identifier of a loyalty account 128, such as an account number, and associated credential information, such as a password for signing in to the loyalty account 128, to the LPDP 102 in order to link the loyalty account 128 to the receiver 104's donation profile 106). After one or more loyalty programs 112 are associated with a donation profile 106 and/or specific donation entries 114 of the donation profile 106, donors 108 are enabled to use those associated loyalty programs 112 to make loyalty point donations to the donation profile 106 as described herein. It should be understood that the receiver 104 may be enabled to create and/or manage a donation profile 106 as described using a user interface such as the GUI illustrated in FIG. 6 and described below.

In further examples, creating the donation profile 106 requires that the cause of the donation profile 106 be certified with the LPDP 102 by a medical professional 130 or other trusted party by providing certification data 132 (e.g., a signed certification form). The certification procedure may be defined by the entity that manages the LPDP 102 and/or one or more loyalty programs 112 that have agreed to participate with the LPDP 102 to enable the donation of loyalty points. In some examples, the certification of a cause for a donation profile 106 includes providing a medical professional 130, such as a physician, a certification form and then receiving certification data 132 in the form of a signed copy of the certification form, which includes a description of the donation profile 106 cause and a certification by the medical professional 130 that the expenses for which the receiver 104 is requesting donations are associated with the cause. The certification data 132 may be provided directly to the LPDP 102 and/or to the receiver 104, who may then provide it to the LPDP 102, as illustrated.

The LPDP 102 further includes hardware, firmware, and/or software to enable donors 108 to submit donation requests 110 and to process donation requests 110 to facilitate the donation of loyalty points from the donor 108's loyalty account 128 to a receiver 104's loyalty account 128. The donor 108 creates and populates a donation request 110 by providing a loyalty account identifier 120 of a loyalty account 128 from which the donor 108 wishes to donate, credential data 122 associated with the loyalty account 128 that verifies that the donor 108 owns the loyalty account 128, and a point donation quantity 124 indicating a quantity of loyalty points to donate from the loyalty account 128. Such information may be provided via a user interface such as the GUI illustrated in FIG. 7 and described below. In some examples the donor 108 is further enabled to search or otherwise view one or more donation profiles 106 that have been created on the LPDP 102 and select a donation profile 106 to which to direct a donation request 110.

Figure 7:
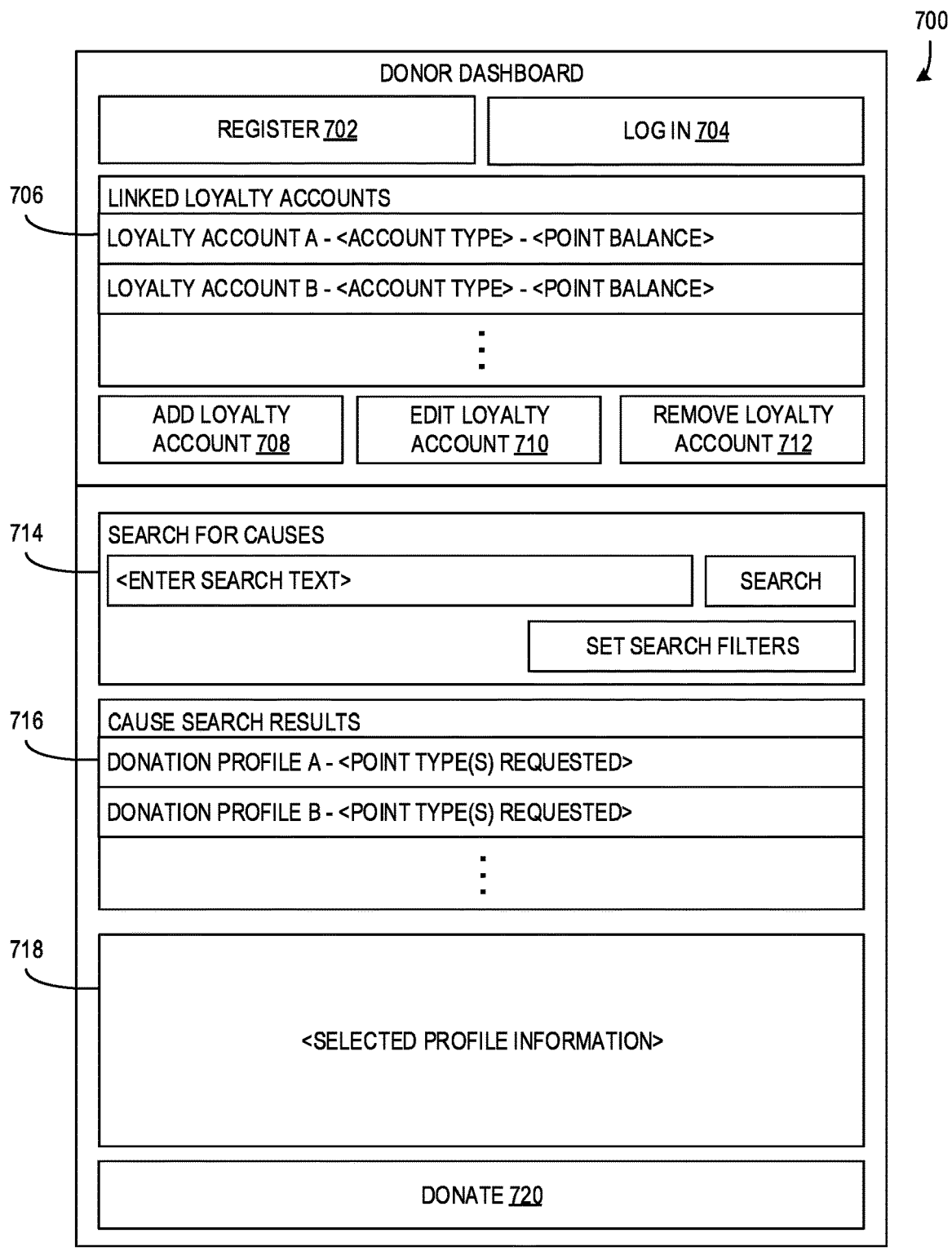
FIG. 7 is a diagram illustrating a donor dashboard GUI according to an embodiment.

In further examples, the LPDP 102 is configured to enable donors 108 to create donor profiles. A donor profile on the LPDP 102 is configured to store links to loyalty programs that the donor 108 can use to make donations as well as information about donations that the donor 108 has made in the past (e.g., links to the donation profiles 106 to which the donor has donated such that the donor 108 is enabled to monitor the progress of the donation profiles 106 and/or receive messages about the donation profiles 106). Once a donor 108's loyalty account information is stored in a donor profile on the LPDP 102, the donor 108 is enabled to select from the already-linked loyalty accounts 128 when populating a donation request 110, as illustrated in the GUI of FIG. 7. Additionally, once the donor 108 selects a particular donation profile 106 for donation, the LPDP 102 may be configured to display loyalty point balances for each of the linked loyalty accounts 128 and recommend or otherwise highlight donor loyalty accounts 128 that can be used to contribute to the donation profile 106 based on which loyalty programs 112 the receiver 104 has associated with the donation profile 106.

While the loyalty points donations primarily described herein include donations of points from one loyalty account to another loyalty account within a loyalty program 112, in other examples, the LPDP 102 is configured to enable donations of loyalty points from one loyalty program 112 to a receiver loyalty account 128 associated with a different loyalty program 112. Such a donation of exchanged points between loyalty programs 112 would rely on the agreement of the loyalty programs 112 involved in the exchange, but once those parties are in agreement, the LPDP 102 may be configured to offer such exchanged loyalty point donations to provide additional flexibility for donors 108 and substantially increase the size of the pool of potential donors for receivers 104.

Figure 2:
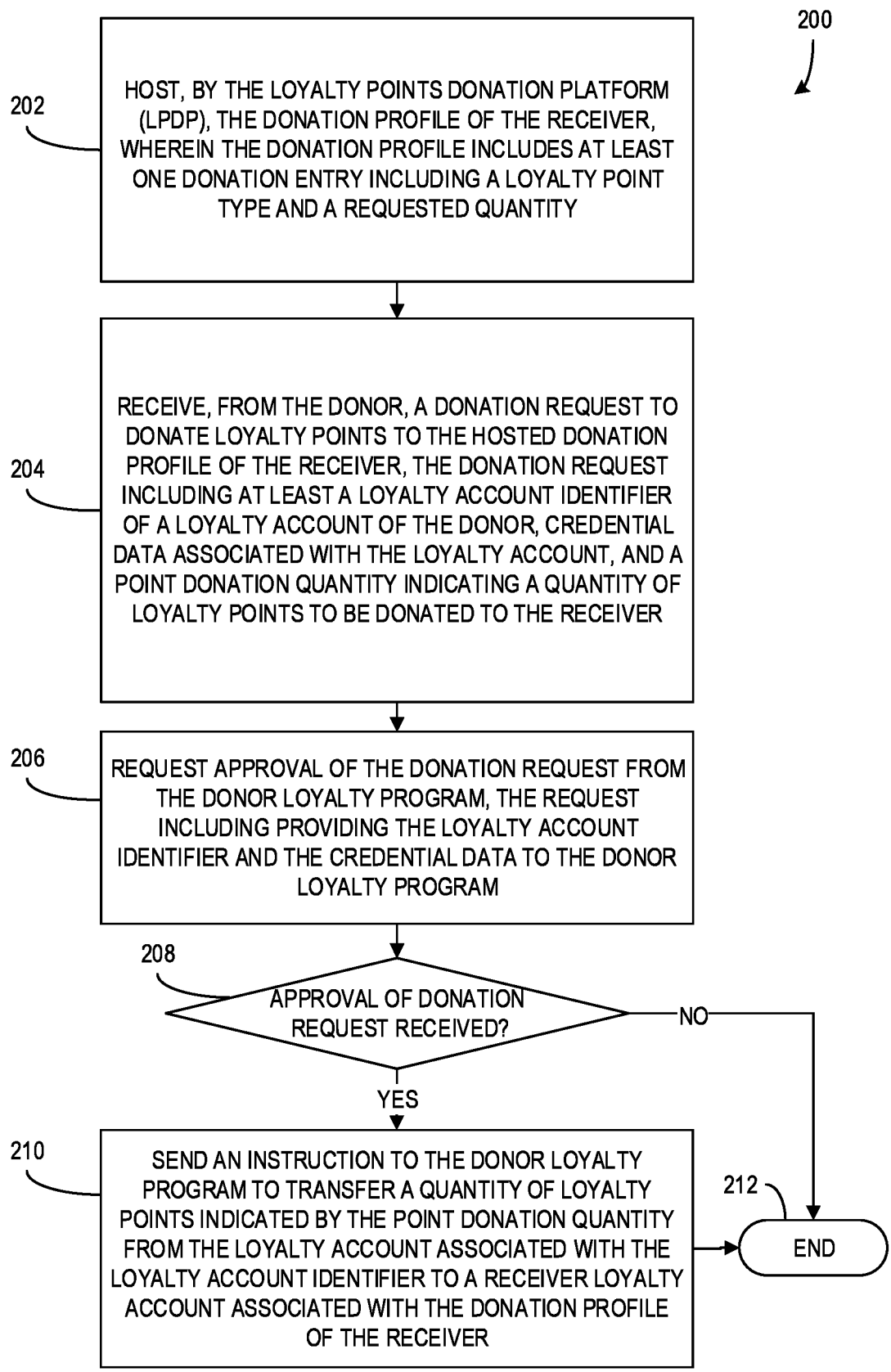
FIG. 2 is a flow chart illustrating a method of processing a donation of loyalty points from a donor account to a receiver account according to an embodiment.

FIG. 2 is a flow chart illustrating a method 200 of processing a donation of loyalty points from a donor account to a receiver account according to an embodiment. In some examples, the method 200 is performed by a LPDP and/or other components of a system such as system 100 of FIG. 1 as described herein. At 202, the LPDP (e.g., LPDP 102) hosts the donation profile of the receiver, wherein the donation profile includes at least one donation entry including a loyalty point type and a requested quantity, wherein the at least one donation entry has been approved by at least one loyalty program associated with the loyalty point type. In some examples, hosting the donation profile includes exposing the donation profile and associated cause information to the Internet and/or other computer network(s), such that other users and potential donors can view the donation profile and/or the associated cause information. Further, the donation profile may be made available for searching, including search functionality within the LPDP and/or general Internet search functionality (e.g., GOOGLE, BING). Additionally, or alternatively, hosting the donation profile may include sharing links and/or other information about the donation profile with other users on social media such that it can be accessed and/or shared throughout social media websites and/or applications based on preferences defined by the receiver. For instance, prior to hosting the donation profile, the receiver of the donation profile may be enabled to select social media sites upon which to share the donation profile as well as selecting particular users of those sites to share the profile with upon hosting (e.g., sharing the donation profile with the receiver's contacts, friends list, or a selected subset thereof).

At 204, a donation request to donate loyalty points to the hosted donation profile of the receiver is received by the LPDP. The donation request includes at least a loyalty account identifier of a loyalty account of the donor, credential data associated with the loyalty account, and a point donation quantity indicating a quantity of loyalty points to be donated to the receiver, wherein the loyalty account is associated with a donor loyalty program of the at least one loyalty program associated with the loyalty point type. In some examples, the donation request includes additional information, such as a message from the donor to the receiver wishing the receiver well.

At 206, the LPDP requests approval of the donation request from the donor loyalty program, the request including providing the loyalty account identifier and the credential data to the donor loyalty program. In some examples, the LPDP and donor loyalty program have an established API through which the approval request is sent automatically based on receiving the donation request from the donor. Further, in examples where the donor has already linked some loyalty accounts to a donor profile on the LPDP, the LPDP may be configured to automatically select and/or recommend loyalty account information to include in the approval request from the associated loyalty program (e.g., the donor wants to donate to a donation profile that is requesting air travel miles and has only one air travel loyalty account linked to their donor profile, so the LPDP automatically requests the approval for the donation from the loyalty program associated with the linked air travel loyalty account of the donor).

If, at 208, approval of the donation request is received from the loyalty program, the process proceeds to 210. Alternatively, if the donation request is not approved at 208, the process ends at 212. Additionally, or alternatively, receiving a rejection of the approval request or otherwise failing to receive an approval of the donation request at 208 may result in the LPDP automatically taking other actions. For instance, the LPDP may notify the donor that the donation request has not been approved and cannot be completed as a result. Further, the LPDP may be configured to prompt the donor to make changes to the initial donation request and/or to try the donation request again. If the rejection of the request from the loyalty program includes a reason for the rejection (e.g., insufficient loyalty points balance or the donation profile has not been properly vetted or validated) the prompt to the donor may include some or all of such information. Additionally, or alternatively, the LPDP may recommend that the donor try to make the donation again with a different linked loyalty account (e.g., "Your air travel loyalty points donation failed, do you want to make a donation using your hotel loyalty points?").

After receiving approval of the donation request by the loyalty program at 208, at 210, the LPDP sends an instruction to or otherwise instructs the donor loyalty program to transfer a quantity of loyalty points indicated by the point donation quantity from the loyalty account associated with the loyalty account identifier to a receiver loyalty account associated with the donation profile of the receiver. In some examples, the LPDP makes use of an established API with the donor loyalty program to issue the instructions. The established API is configured to be secure, such that the donor loyalty program trusts that the cause for which the loyalty points are being transferred has been verified as legitimate by the LPDP. After the instructions are provided to the donor loyalty program, the process ends at 212 from the perspective of the LPDP.

Additionally, in some examples, the LPDP receives a notification from the donor loyalty program upon completion of the transfer of loyalty points from the donor's loyalty account to the receiver's loyalty account. In response to receiving the notification, the LPDP may be configured to notify the donor and/or the receiver that the donation has been completed, including informing the donor of the amount donated and a remaining balance of loyalty points in the donor's loyalty account and informing the receiver of the amount donated and the new balance of loyalty points in the receiver's loyalty account.

Figure 3:
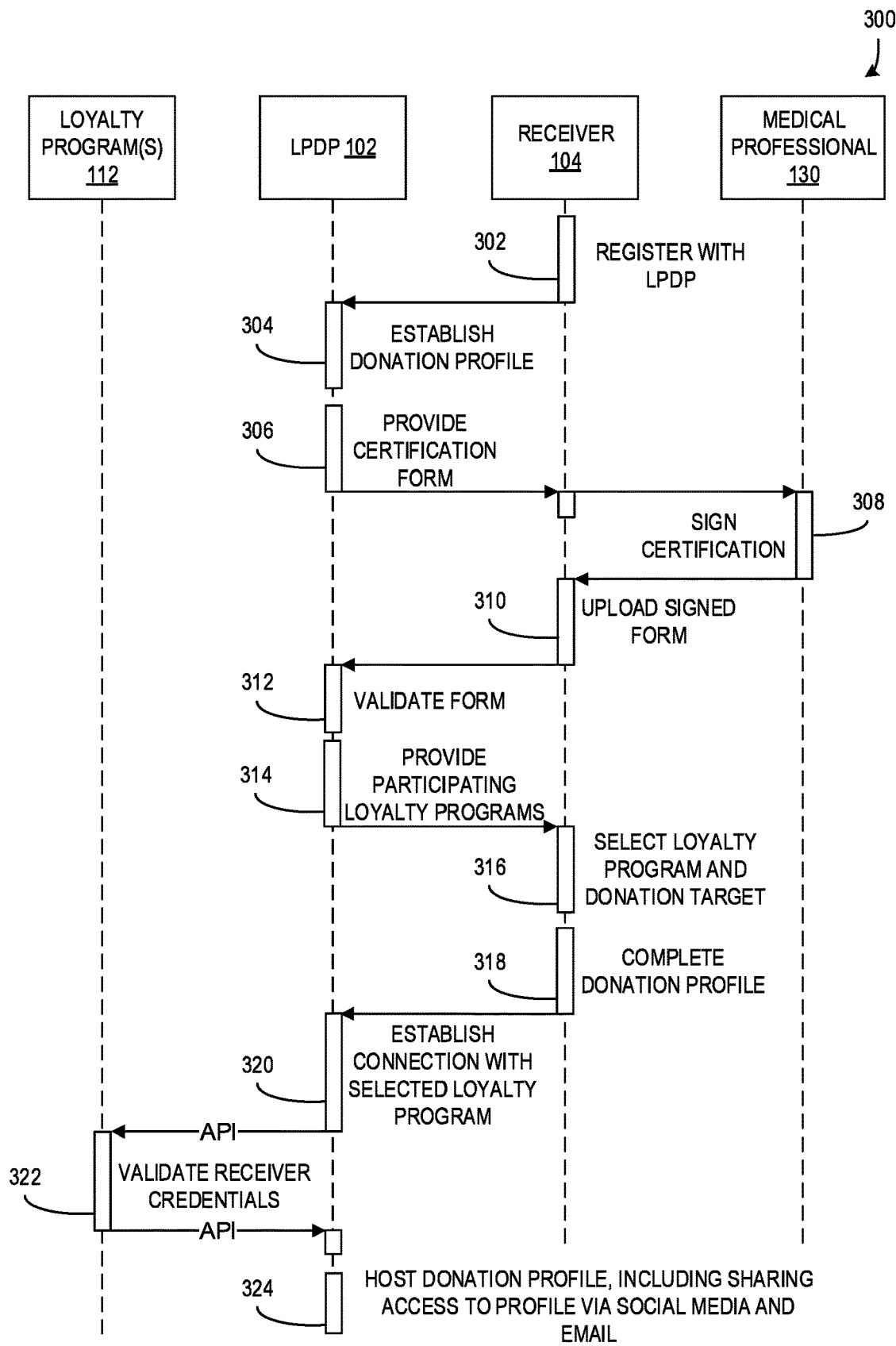
FIG. 3 is a sequence diagram illustrating a receiver establishing a donation profile for requesting loyalty point donations according to an embodiment.

FIG. 3 is a sequence diagram 300 illustrating a receiver 104 establishing a donation profile for requesting loyalty point donations according to an embodiment. The illustrated process includes interactions between the receiver 104, the LPDP 102, a loyalty program 112, and a medical professional 130. Further, it should be understood that, in some examples, the process illustrated in the diagram 300 may be performed in a system including an LPDP (e.g., system 100 with LPDP 102) as described herein. At 302, the receiver 104 registers with the LPDP 102 and the LPDP 102 establishes a donation profile (e.g., donation profile 106) at 304. In some examples, registering with the LPDP 102 includes providing information about the cause of the donation profile, such as the reason that loyalty point donations are needed, and/or the types and quantities of loyalty points to be requested (e.g., populating the donation entries of the donation profile). Alternatively, the types and quantities of loyalty points to be requested may be provided by the receiver 104 later in the process, as described below.

At 306, the LPDP 102 provides a certification form to the receiver 104 and/or a medical professional 130 for certification by the medical professional 130. In some examples, the certification form may be an electronic form that can be electronically signed by the medical professional 130 at 308. Alternatively, or additionally, the LPDP 102 may provide the receiver 104 a copy of the certification form and the receiver 104 may obtain a signature from the medical professional at 308. The receiver 104 uploads or otherwise provides the signed form to the LPDP 102 at 310 and, at 312, the LPDP 102 validates the signed form. In some examples, validating the signed form includes automated validation of the electronic signature of the medical professional 130. Alternatively, or additionally, validating the signed form may include manual validation of the signature by a user associated with the LPDP 102.

At 314, the LPDP 102 provides participating loyalty programs to the receiver 104. At this point, in some examples, the receiver 104 may provide the types and/or quantities of loyalty points to request. Alternatively, the receiver 104 may provide specific expenditures for which they need loyalty points and the LPDP 102 may be configured to convert those expenditures into an associated type and quantity of loyalty points. For instance, the receiver 104 may input that they need to stay in Hotel X for five nights in a date range and the LPDP 102 determines the type or types of loyalty points that can be used at Hotel X and the quantity of loyalty points needed for five nights there. The LPDP 102 may be configured to provide the participating loyalty programs at 314 based on the loyalty point type information provided by the receiver 104, such that the provided loyalty programs offer loyalty points of a type or types that the receiver 104 is requesting for donation.

At 316, the receiver 104 selects a loyalty program or programs from the participating loyalty programs provided by the LPDP 102, as well as a donation target (e.g., a requested quantity or quantities 118). In some examples, the receiver 104 selects one or more loyalty programs for each loyalty point type that is being requested (e.g., at least one hotel loyalty program for hotel loyalty points, at least one air travel loyalty program for air travel loyalty points). Further, selecting loyalty programs may include the receiver 104 providing loyalty account information of loyalty accounts the receiver 104 owns with the selected loyalty programs, such that the LPDP 102 is enabled to provide receiver loyalty account information to the loyalty programs during donation processing as described herein. In some examples, the donation target quantity is defined to include variance to account for changing prices of expenses (e.g., a donation target of 1000 loyalty points for use in paying for a hotel stay is configured to potentially vary by 10%, 20%, or some other defined percentage or quantity of points while still enabling the donation target to be met if the price of the hotel stay changes over time).

At 318, the receiver 104 then completes the donation profile, confirming the loyalty program selections and/or other settings of the donation profile with the LPDP 102. In some examples, completing the donation profile includes the receiver 104 completing the configuration of the description of the cause of the donation profile, inclusion of photos and/or other media associated with the cause, configuration of social media of the donation profile, configuration of due dates, expiration dates, or donation goal dates of the donation entries of the profile, configuration of donation caps that limit the total quantity loyalty points that can be donated to the donation profile and/or associated donation entries, and/or the like.

At 320, the LPDP 102 establishes a connection with the loyalty program or programs 112 selected by the receiver 104, including sharing receiver credentials associated with a receiver loyalty account. The connection may be established using an existing API between the LPDP 102 and the loyalty program 112. Alternatively, if no API exists yet, establishing the connection between the LPDP 102 and the loyalty program may include the LPDP 102 requesting the establishment of an API that is configured to handle communications associated with the operations of the LPDP 102 for this donation profile and/or other donation profiles that are linked to the loyalty program 112. Further, establishing the connection may include the LPDP 102 providing the loyalty program 112 with loyalty account information associated with the receiver 104's loyalty account for use in donation processing as described herein.

At 322, the loyalty program 112 validates receiver credentials sent by the LPDP 102 upon establishing the connection. Upon the receiver credentials being validated or failing to be validated, the loyalty program 112 provides the results of the validation to the LPDP 102.

At 324, once the donation profile is completely validated or otherwise approved by the LPDP 102 and any associated loyalty programs 112, the LPDP 102 hosts the donation profile to provide access to the donation profile to other users of the system, including potential donors. In some examples, hosting the donation profile includes sharing or otherwise sending access information of the donation profile to other users via social media, electronic mail (email), and/or the like. For instance, during the completion of the donation profile or at another point during the process, the receiver 104 may provide contact information (e.g., email addresses, social media profile information, usernames, etc.) for other users with which the receiver 104 wants to share the donation profile and, when it is hosted, that contact information is used to share the hosted donation profile with those identified users.

In some examples, prior to hosting the donation profile, the LPDP 102 is configured to include an automated process to check the feasibility of the donation entries as configured by the receiver 104. For instance, the LPDP 102 may compare the location that the receiver 104 is traveling with the location in which the receiver 104 lives to determine if the distance is large enough to merit a requested flight, to determine if airports selected by the receiver 104 are within a reasonable proximity to the locations, to determine if the distance is large enough to merit a requested hotel stay, and/or the like. This automated process may be configured to cause the LPDP 102 to request additional information from the receiver 104 when a discrepancy or other issue is identified and/or to flag the donation profile for a closer review by a user associated with the LPDP 102 prior to the donation profile being approved for hosting.

Further, in some examples, prior to hosting the donation profile, the receiver 104 is provided with a preview of the donation profile by the LPDP 102 and prompted to approve or reject publishing and/or hosting the donation profile based on the preview. If the receiver 104 approves the donation profile to be published, the LPDP 102 proceeds to host the donation profile as described herein. Alternatively, if the receiver 104 rejects the donation profile, the LPDP 102 enables the receiver 104 to reconfigure or otherwise make changes to the profile, after which the LPDP 102 may provide an updated preview for evaluation by the receiver 104.

Figure 4:
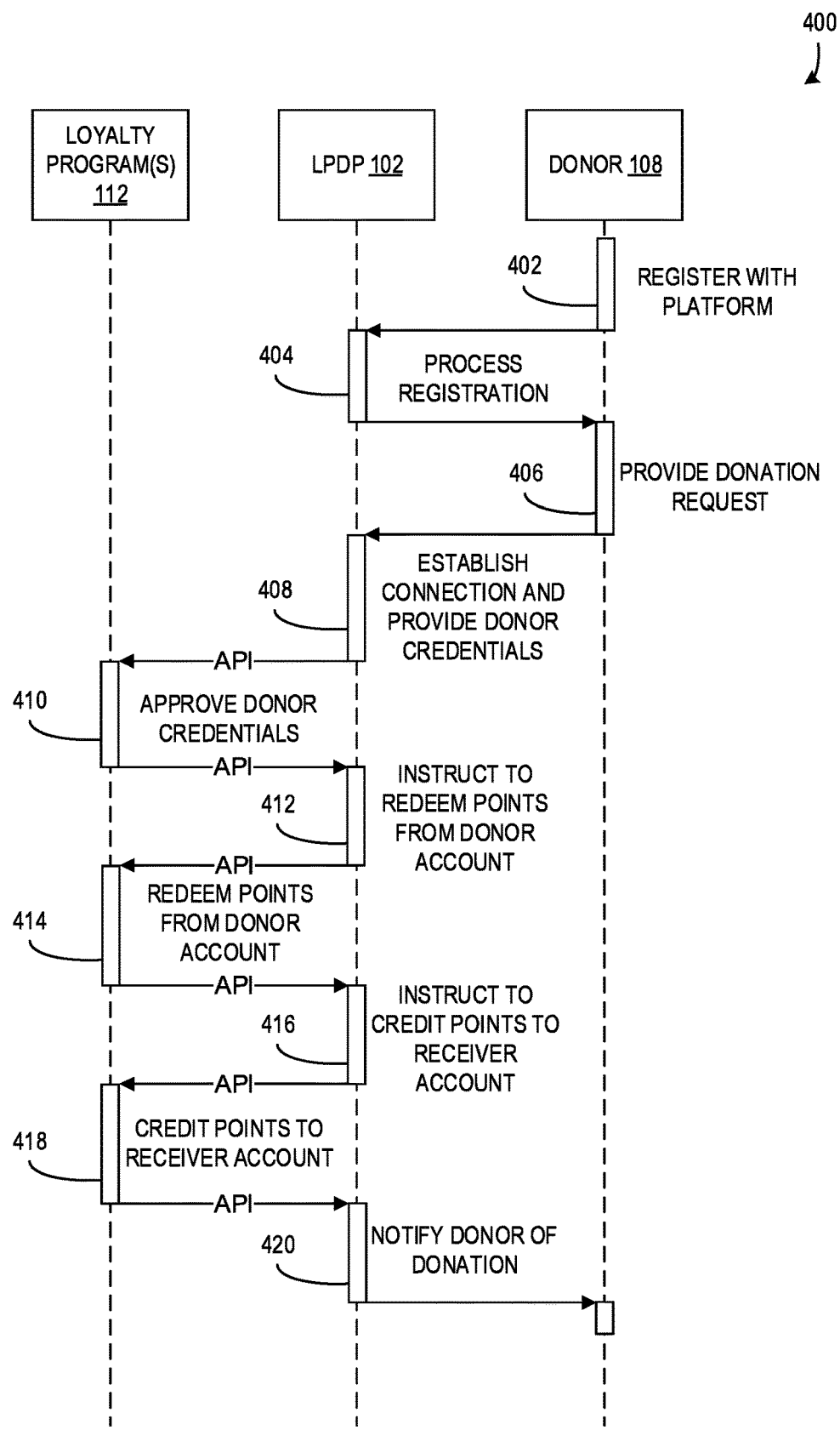
FIG. 4 is a sequence diagram illustrating a donor registering with a donation platform and donating loyalty points to a receiver account via the donation platform according to an embodiment.

FIG. 4 is a sequence diagram 400 illustrating a donor registering with a donation platform and donating loyalty points to a receiver account via the donation platform according to an embodiment. The illustrated process includes interactions between the donor 108, the LPDP 102, the loyalty program 112. Further, it should be understood that, in some examples, the process illustrated in the diagram 400 may be performed in a system including an LPDP (e.g., system 100 with LPDP 102) as described herein. At 402, the donor 108 registers with the LPDP 102 and, at 404, the LPDP 102 processes the donor 108's registration. In some examples, the registration process includes the donor 108 providing contact information and/or loyalty account information to the LPDP 102 and the LPDP 102 storing the provided information in association with a donor profile of the donor 108. The donor 108 may also create a username or other donor profile identifier and a password to enable the donor 108 to sign in to the donor profile later. Additionally, or alternatively, the LPDP 102 may be configured to enable the donor 108 to provide one or more donation preferences (e.g., types of causes in which the donor 108 is interested, location-based preferences, notification preferences, and/or the like). Such donation preferences may be used by the LPDP 102 to recommend or otherwise display donation profiles to the donor 108 when they access the donor profile or search for donation profiles.

At 406, the donor 108 provides a donation request (e.g., donation request 110) to the LPDP 102. In some examples, the LPDP 102 displays a donation profile (e.g., donation profile 106) to the donor 108, including displaying information about the cause of the donation profile and information about one or more donation entries of the donation profile. The display of the donation entries may include displaying the type of loyalty points requested, the quantity of loyalty points requested, the current progress toward the loyalty points goal for each entry, etc. Further, displaying the donation entries may include recommending or otherwise highlighting donation entries that are associated with loyalty programs with which the donor 108 has loyalty accounts. For instance, the donation entries may be displayed in an order with donation entries to which the donor 108 can donate using the loyalty accounts linked to their donor profile displayed first and other donation entries displayed later. Additionally, or alternatively, the donation entries to which the donor 108 can donate based on the donor profile may be highlighted using bold text, different colors, or other methods of emphasizing the donation entries.

Providing the donation request at 406 may include the donor 108 selecting a loyalty account that is linked with the donor profile from which to donate or, alternatively, entering loyalty account information of a loyalty account that is not already linked with the donor profile. The loyalty account information, including a loyalty account identifier and/or credentials associated with the loyalty account are used to populate the donation request as described herein. In some examples, the donor 108 further provides confirmation that they own and/or have the authority to donate loyalty points from the loyalty account.

At 408, the LPDP 102 establishes a connection with the loyalty program 112 via an API and provides the donor credentials from the donation request. In some cases, the API between the LPDP 102 and the loyalty program 112 is already established as described herein and the connection specific to the donation request is established via that API. At 410, loyalty program 112 approves the donor credentials and communicates the approval to the LPDP 102 over the API. At 412, the LPDP 102 instructs the loyalty program 112 to redeem loyalty points from the donor loyalty account and, at 414, the loyalty program 112 receives the instructions and redeems the loyalty points from the donor loyalty account as instructed.

At 416, the LPDP 102 instructs the loyalty program 112 to credit the loyalty points to the receiver loyalty account and, at 418, the loyalty program 112 receives the instructions and credits the loyalty points to the receiver loyalty account as instructed.

At 420, the LPDP 102 notifies the donor 108 of a successful donation to the donation profile. In some examples, the notification further includes a remaining balance of loyalty points in the donor 108's loyalty account after the donation and/or donation profile information including progress toward a donation goal as a result of the donor 108's donation.

It should be understood that, in some examples, when the LPDP 102 instructs the loyalty program 112 to take an action or vice versa, the instruction includes sending an instruction or instructions configured to be interpreted by the recipient via an API established between the LPDP 102 and the loyalty program 112.

In some examples, loyalty point donations may be recommended or otherwise triggered automatically based on donor preferences associated with a donor profile of donor 108. For instance, in examples where the LPDP 102 is provided by or otherwise managed by a payment network entity, the LPDP 102 may be configured to monitor transactions associated with credit card accounts or other financial accounts of the donor 108 that result in the donor 108 accruing loyalty points for one or more of the donor 108's loyalty accounts. Upon detecting an accrual of loyalty points by the donor 108, the LPDP 102 may send a notification or otherwise prompt the donor 108 to consider donating the loyalty points that have just been accrued (e.g., a mobile device notification stating "Hello, you have just earned 100 points with hotel loyalty program. Would you like to donate these points?"). The prompt may further include a link, button, or other interface enabling the donor 108 to populate and send a donation request associated with the recently accrued loyalty points. Such notifications may be configured by the donor 108 in the preferences of a donor profile. In some examples, such notifications prompt the donor 108 to donate the points to a currently active donation profile that they have already donated to, but alternatively, or additionally, the notifications prompt the donor 108 to donate the points to other active donation profiles that are similar to donation profiles to which they have previously donated or donation profiles that otherwise fit the donor's preferences.

Figure 5:
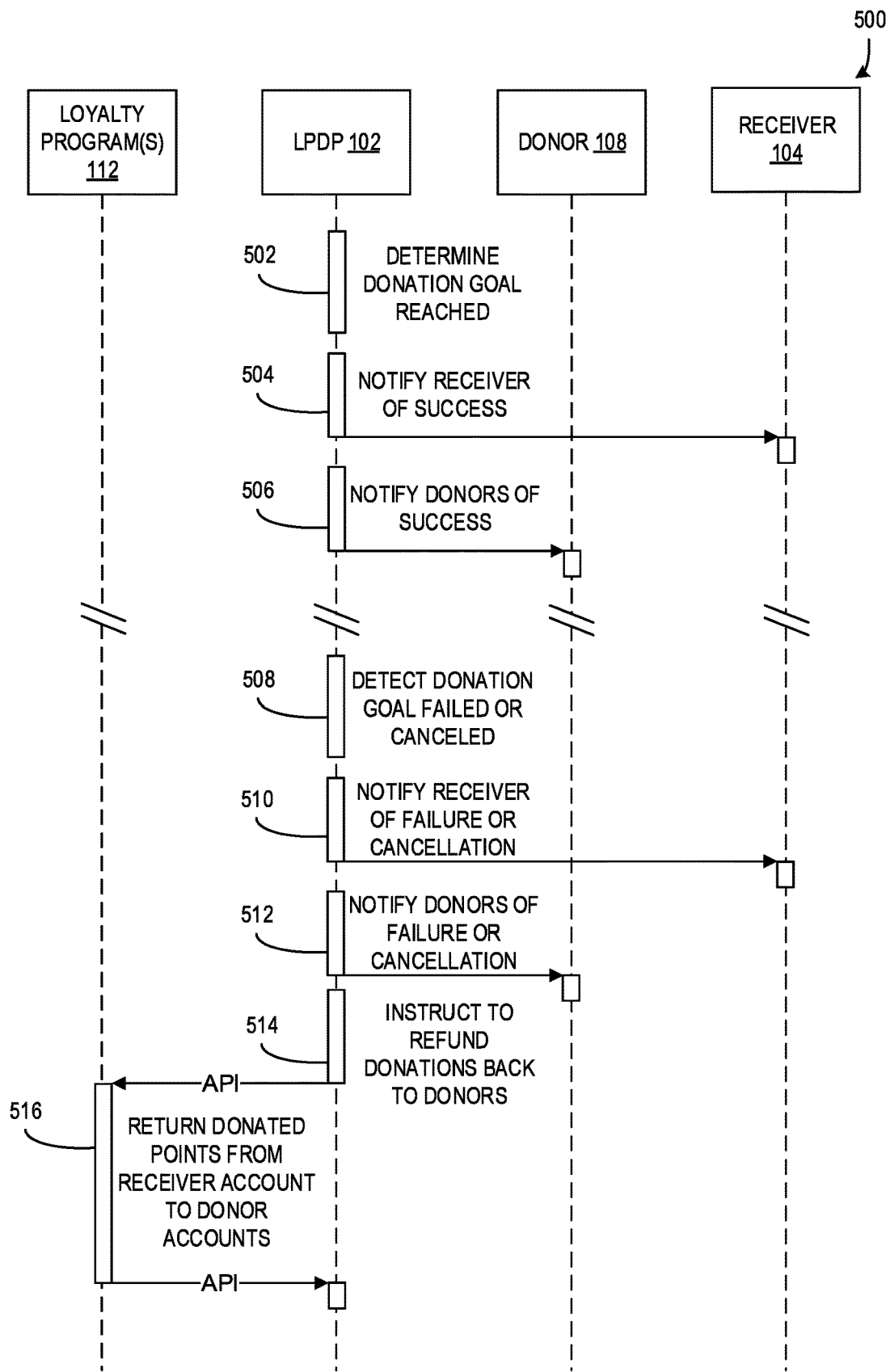
FIG. 5 is a sequence diagram illustrating the donation platform processing a reached donation goal and a failed or canceled donation goal according to an embodiment.

FIG. 5 is a sequence diagram 500 illustrating the donation platform processing a reached donation goal and a failed or canceled donation goal according to an embodiment. The illustrated process includes interactions between the receiver 104, the donor 108, the LPDP 102, the loyalty program 112. Further, it should be understood that, in some examples, the process illustrated in the diagram 500 may be performed in a system including an LPDP (e.g., system 100 with LPDP 102) as described herein. At 502, the LPDP 102 determines that a donation goal of a donation profile has been reached (e.g., a donation entry of the donation profile has received at least as many points as the requested quantity of the donation entry). At 504, the LPDP 102 notifies the receiver 104 of successfully reaching the goal and, at 506, the LPDP 102 notifies the donor or donors 108 that contributed to the goal of successfully reaching the goal. The notifications to the donors 108 and or receiver 104 may be in the form of mobile device notifications, emails, text messages, or other types of notifications without departing from the description herein. Further, reaching the donation goal may cause the LPDP 102 to share that the goal has been reached on social media as configured in the receiver 104's donation profile.

In some examples, the donation goal or requested quantity of loyalty points of a donation profile and/or associated donation entry is also a cap on the quantity of loyalty points that can be donated, such that donations of loyalty points beyond the requested quantity are prevented (e.g., donors are prevented from donating to a donation entry for which the requested quantity has been reached, donations of loyalty points that would exceed the requested amount of the donation entry are reduced to comply with the donation cap for that donation entry).

Alternatively, or additionally, at 508, the LPDP 102 detects that a donation goal has failed or otherwise been canceled. At 510, the LPDP 102 notifies the receiver 104 of the failure of the donation goal and, at 512, the LPDP 102 notifies the donor or donors 108 that contributed to the goal of the failure of the goal. At 514, the LPDP 102 instructs the loyalty program 112 associated with the donation goal to refund the donations from the receiver loyalty account to the associated donor loyalty accounts. At 516, the loyalty program 112 receives the instructions and refunds the donated loyalty points from the receiver loyalty account to the associate donor loyalty accounts as instructed. Further, in some examples, the LPDP 102 notifies the donors when the refunding of donated loyalty points is complete, including providing the donors with updated loyalty account balances and/or information indicating a reason or explanation for why the donation goal failed or has been canceled.

In some examples where the receiver 104 cancels a donation entry and/or an entire donation profile, the LPDP 102 prompts the receiver 104 to provide a reason and/or explanation for the cancelation. Some or all of the provided reason or explanation information may be displayed on the canceled donation profile and/or sent out to donors 108 that had previously donated to the donation profile.

In some examples, the LPDP 102 is further configured to handle excess donated loyalty points and or loyalty points that have been donated to a failed or canceled donation profile in such a way that the loyalty points may be preserved and/or redirected for use with other approved donation profiles. For instance, if a donor selects to donate a quantity of loyalty points to a donation profile and the total cost of the associated expense requires fewer loyalty points than were donated, the donor may be prompted by the LPDP 102 to redirect the excess loyalty points to other donation profiles (e.g., active donation profiles that are compatible with the excess loyalty points). Alternatively, or additionally, the LPDP 102 may be configured to obtain consent or confirmation from donors that a receiver of a donation profile that receives excess loyalty points is allowed to donate those excess loyalty points to other donation profiles and/or consent or confirmation from donors that excess donated loyalty points may be redirected into a general pool of donated loyalty points that may be provided to donation profiles as determined by the LPDP 102 and/or users associated therewith. Further, excess donated loyalty points may be redirected or provided to other donation profiles in other ways without departing from the description herein.

Additional Example Scenarios

Aspects of the disclosure enable various additional scenarios, such as next described.

Figure 6:
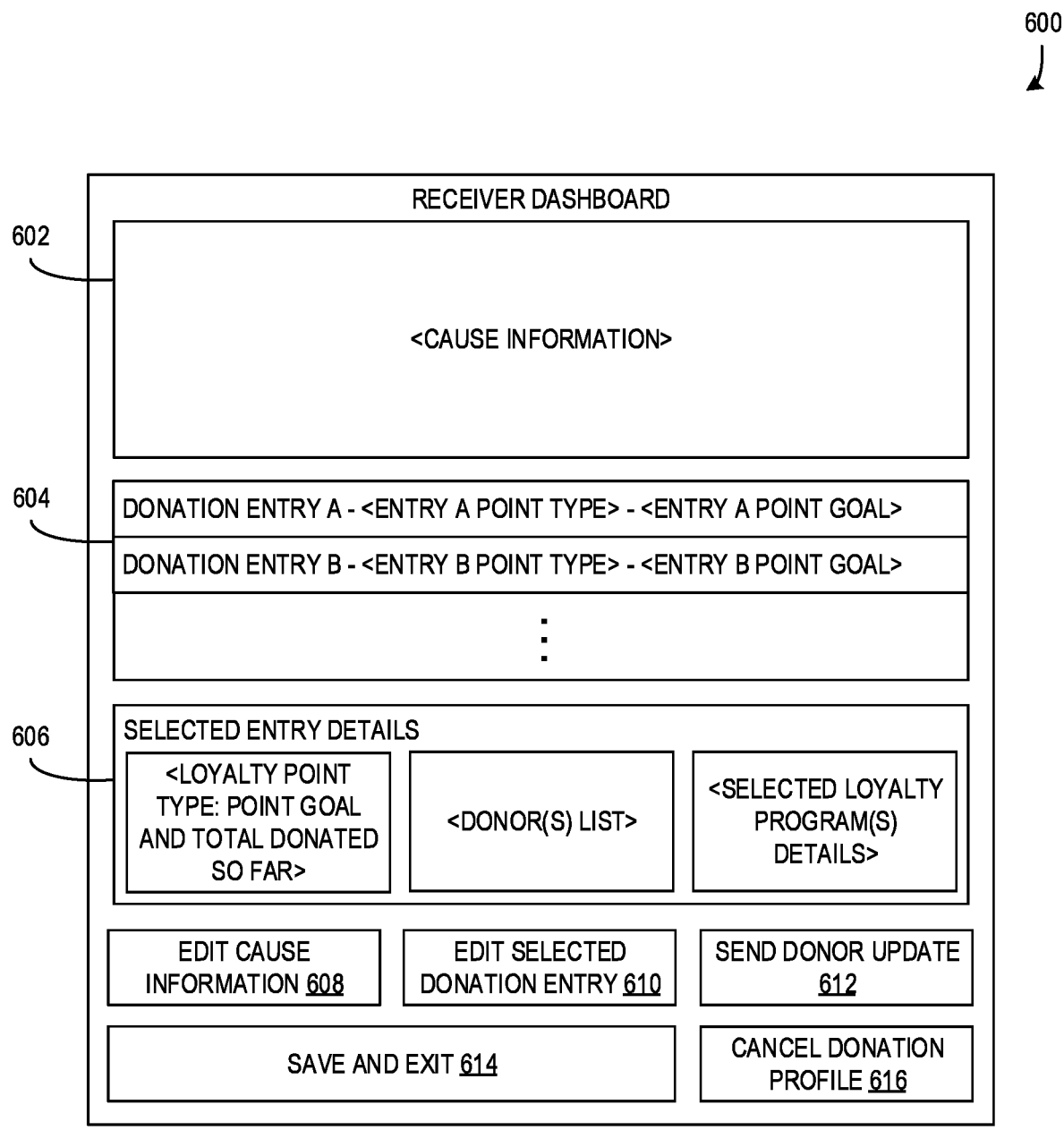
FIG. 6 is a diagram illustrating a receiver dashboard graphical user interface (GUI) according to an embodiment.

In some examples, the disclosure enables user interfaces that users (e.g., receivers and donors) use to interact with systems (e.g., system 100) and/or perform methods as described herein. FIGS. 6 and 7 provide examples of such user interfaces.

FIG. 6 is a diagram illustrating a receiver dashboard graphical user interface (GUI) 600 according to an embodiment. The receiver dashboard GUI 600 includes a cause information element 602, a donation entry list element 604, a selected entry details element 606, an edit cause information button 608, an edit selected donation entry 610, a send donor update button 612, a save and exit button 614, and a cancel donation profile button 616. In some examples, the receiver dashboard GUI 600 is used by a user to configure a donation profile in a system such as system 100 described herein.

The cause information element 602 configured for displaying cause information of the donation profile, such as a description of the cause, descriptions of the services needed, dates and/or times associated with the cause, and/or the like. The donation entry list element 604 is further configured for displaying information of the donation entries of the donation profile, including the type and quantity of loyalty points requested for each donation entry. For instance, as illustrated, the donation entry list element 604 displays a Donation Entry A and a Donation Entry B, each with a point type and a point goal quantity. In some examples, the user of the GUI 600 is enabled to select one or more of the donation entries via touching a touchscreen or selecting using a keyboard, mouse, or other user interface of a computing device.

The selected entry details element 606 is configured for displaying information that is specific to a donation entry that the user has selected from the donation entry list element 606. For instance, as illustrated, the selected entry details element 606 displays a loyalty point type, loyalty point goal quantity, and a total donated so far. Further, the element 606 displays a list of donors that have made donations and any other associated loyalty program details.

The edit cause information button 608 is configured to enable a user of the GUI to enter, update, or otherwise edit the cause information displayed in the cause information element 602. When activated or otherwise selected, the edit cause information button 608 may cause a new editing interface to be displayed and/or it may cause the cause information element 602 to become an editable text box or other editable interface element. Further, the edit selected donation entry button 610 is configured to enable the user of the GUI to enter, update, or otherwise edit the entry details of a selected donation entry as displayed in the selected entry details element 606. When activated or otherwise selected, the edit selected donation entry button 610 may cause a new editing interface to be displayed and/or it may cause portions of the selected entry details element 606 to become editable interface elements.

The send donor update button 612 is configured to enable the user of the GUI 600 to draft and send messages to the donors that have contributed to the donation profile. As with the other buttons 608 and 610, when the send donor update button 612 is activated or otherwise selected, it may cause an editable interface to be displayed, enabling the user to enter the message to be sent, select all or a subset of donors as recipients of the message, and/or the like.

The save and exit button 614 is configured to enable the user of the GUI 600 to save any changes made to the donation profile and exit the GUI 600. The user may be returned to a sign in interface and/or the like. Any changes made and saved by the user are the reflected in the hosted donation profile as it is displayed to donors or other users that view the donation profile. The cancel donation profile button 616 is configured to enable the user of the GUI 600 to cancel the donation profile. In some example, activating or otherwise selecting the cancel donation profile 616 causes an interface to be displayed to the user that enables the user to provide a reason for the cancelation. The reason may then be provided to the donors who have donated to the donation profile and the associated system may cause the donations made by those donors to be returned to the donors as described herein.

FIG. 7 is a diagram illustrating a donor dashboard GUI 700 according to an embodiment. The donor dashboard GUI 700 includes a register button 702, a log in button 704, a linked loyalty accounts element 706, an add loyalty account button 708, an edit loyalty account button 710, and a remove loyalty account button 712. Further, the donor dashboard GUI 700 includes a cause search element 714, a cause search results element 716, a selected profile information element 718, and a donate button 720.

The register button 702 is configured to enable a user of the GUI 700 to register for a donor profile that the user can use to make donations to donation profiles. The log in button 704 enables a user that already has a registered donor profile to log in to that profile to view information, make changes to the donor profile, and/or arrange for donations to be made to donation profiles.

The linked loyalty accounts element 706 is configured to display information about loyalty accounts of the user that have been linked to the current donor profile. In some examples, as illustrated, the linked loyalty accounts element 706 displays a list of linked loyalty accounts (e.g., Loyalty Account A, Loyalty Account B) and associated information, including an account type (e.g., air travel loyalty points, hotel loyalty points) and a current point balance for each account. Other information may also be displayed without departing from the description herein.

The add loyalty account button 708, edit loyalty account button 710, and remove loyalty account button 712 enable the user to add new loyalty accounts to the donor profile, edit or otherwise update loyalty accounts that are linked to the donor profile, and remove loyalty accounts from the donor profile respectively.

Activating or otherwise selecting the add loyalty account button 708 may cause an interface to be displayed that enables the user to provide loyalty account information, such as an account number or identifier, sign in information or other credential information, and/or the like. Activating or otherwise selecting the edit loyalty account button 710 may cause an interface to be displayed that enables the user to edit similar account information, as well as enable the user to select a linked loyalty account to edit. Alternatively, or additionally, the linked loyalty accounts element 706 may enable the user to select a loyalty account from the displayed list and edit that selected loyalty account using the edit loyalty account button 710.

Activating or otherwise selecting the remove loyalty account button 712 may cause an interface to be displayed that enables the user to select the loyalty account to be removed from the donor profile and/or confirm with the user that the user actually wants to remove the loyalty account from the donor profile. Alternatively, or additionally, as described above with respect to the edit loyalty account button 710, the element 706 may enable the user select a loyalty account from the displayed list and, upon selecting the remove loyalty account button 712, the GUI 700 initiates the removal of the link between the donor profile and the selected loyalty account.

The cause search element 714 is configured to enable the user to search for causes and/or associated donation profiles based on keyword search and/or other methods of filtering hosted donation profiles. The element 714 includes a text box into which the user may enter keywords, a search button that initiates a search of donation profiles when the user selects it, and a set search filters button that enables the user to provide additional filtering for the search. In some examples, the additional filters include filtering results by loyalty point types, merchants associated with loyalty points, types of causes, specific receivers, and/or the like.

The cause search results element 716 is configured to display the results of searches initiated by the cause search element 714. In some examples, the displayed results include a name or other identifier of each donation profile result, a cause description of the donation profile, type or types of loyalty points requested, and/or quantities of points requested. Further, the cause search results element 716 may enable the user to select one of the results and view more information about the donation profile and/or the associated cause in the selected profile information element 718. Additionally, the donate button 720 is configured to enable the user to donate loyalty points to the donation profile selected in the cause search results element 716. In some examples, selecting the donate button 720 causes an interface to be displayed that enables the user to select a linked loyalty account from which to donate loyalty points (e.g., only linked loyalty accounts with loyalty point types that match one or more point types of the selected donation profile may be available for selection) and to select a quantity of loyalty points to donate. Alternatively, or additionally, the user may be enabled to enter loyalty account information in order to donate from a loyalty account that is not linked to the user's donor account at this point. Once the donation information has been provided, the donation from the donor user to the receiver of the selected donation profile is initiated as described herein.

Exemplary Operating Environment

Figure 8:
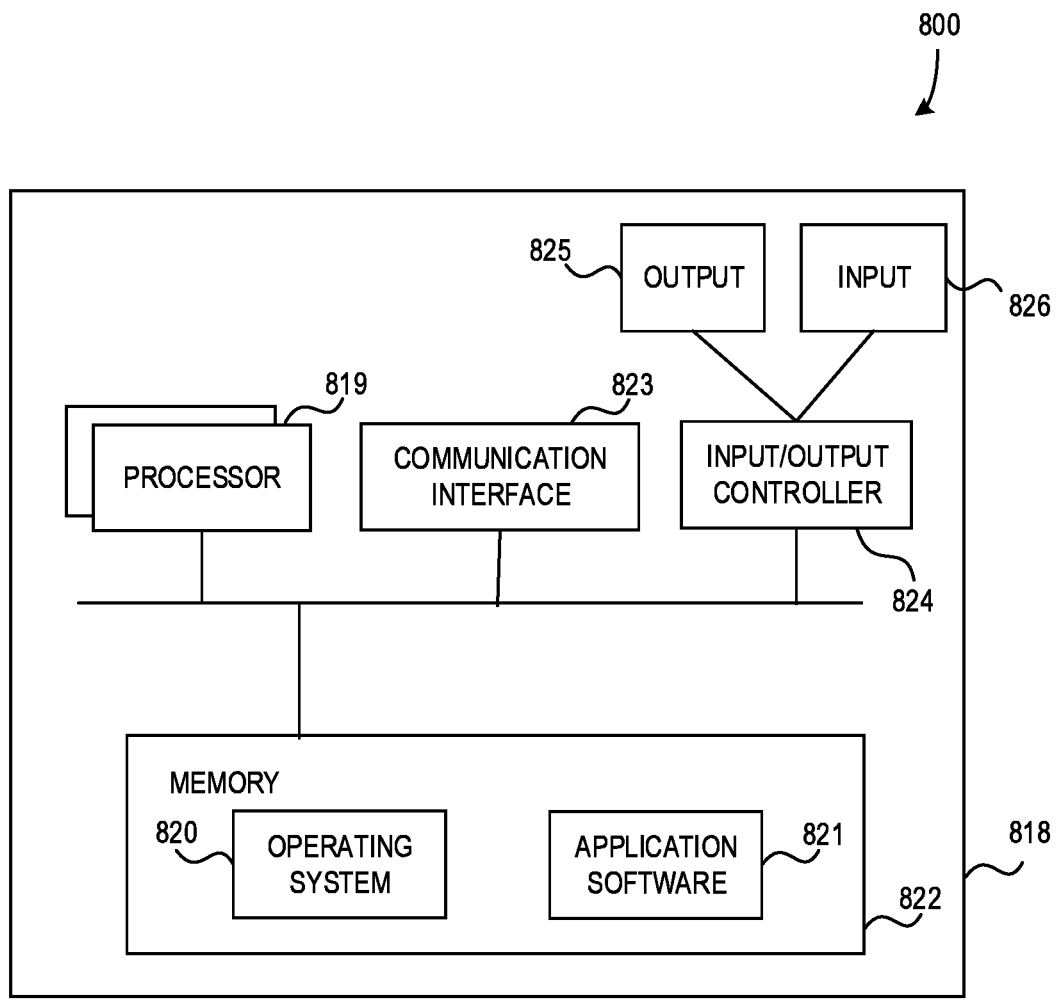
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, enabling donations of loyalty points from a donor loyalty account to a receiver loyalty account of a loyalty program as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device (s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor of an LPDP; and at least one memory comprising computer program code, the at least one memory and the computer program code configured to, with the at least one processor, cause the at least one processor to: host the donation profile of the receiver, wherein the donation profile includes at least one donation entry including a loyalty point type and a requested quantity, wherein the at least one donation entry has been approved by at least one loyalty program associated with the loyalty point type; receive, from the donor, a donation request to donate loyalty points to the hosted donation profile of the receiver, the donation request including at least a loyalty account identifier of a loyalty account of the donor, credential data associated with the loyalty account, and a point donation quantity indicating a quantity of loyalty points to be donated to the receiver, wherein the loyalty account is associated with a donor loyalty program of the at least one loyalty program associated with the loyalty point type; request approval of the donation request from the donor loyalty program, the requesting including providing the loyalty account identifier and the credential data to the donor loyalty program; based on receiving approval of the donation request from the donor loyalty program, send an instruction to the donor loyalty program to transfer a quantity of loyalty points indicated by the point donation quantity from the loyalty account associated with the loyalty account identifier to a receiver loyalty account associated with the donation profile of the receiver.

A computerized method for enabling a donor to donate loyalty points associated with a loyalty program to a receiver based on a donation profile of the receiver, the method comprising: hosting, by a processor of an LPDP, the donation profile of the receiver, wherein the donation profile includes at least one donation entry including a loyalty point type and a requested quantity, wherein the at least one donation entry has been approved by at least one loyalty program associated with the loyalty point type; receiving, by the processor, from the donor, a donation request to donate loyalty points to the hosted donation profile of the receiver, the donation request including at least a loyalty account identifier of a loyalty account of the donor, credential data associated with the loyalty account, and a point donation quantity indicating a quantity of loyalty points to be donated to the receiver, wherein the loyalty account is associated with a donor loyalty program of the at least one loyalty program associated with the loyalty point type; requesting, by the processor, approval of the donation request from the donor loyalty program, the requesting including providing the loyalty account identifier and the credential data to the donor loyalty program; based on receiving approval of the donation request from the donor loyalty program, sending an instruction, by the processor, to the donor loyalty program to transfer a quantity of loyalty points indicated by the point donation quantity from the loyalty account associated with the loyalty account identifier to a receiver loyalty account associated with the donation profile of the receiver.

One or more non-transitory computer storage media having computer-executable instructions for enabling a donor to donate loyalty points associated with a loyalty program to a receiver based on a donation profile of the receiver that, upon execution by a processor, cause the processor to at least: host the donation profile of the receiver, wherein the donation profile includes at least one donation entry including a loyalty point type and a requested quantity, wherein the at least one donation entry has been approved by at least one loyalty program associated with the loyalty point type; receive, from the donor, a donation request to donate loyalty points to the hosted donation profile of the receiver, the donation request including at least a loyalty account identifier of a loyalty account of the donor, credential data associated with the loyalty account, and a point donation quantity indicating a quantity of loyalty points to be donated to the receiver, wherein the loyalty account is associated with a donor loyalty program of the at least one loyalty program associated with the loyalty point type; request approval of the donation request from the donor loyalty program, the requesting including providing the loyalty account identifier and the credential data to the donor loyalty program; based on receiving approval of the donation request from the donor loyalty program, send an instruction to the donor loyalty program to transfer a quantity of loyalty points indicated by the point donation quantity from the loyalty account associated with the loyalty account identifier to a receiver loyalty account associated with the donation profile of the receiver.

Alternatively, or in addition to the other examples described herein, examples include any combination of the following:
further comprising: receiving, by the processor, donation entry data from the receiver; populating, by the processor, the at least one donation entry of the donation profile based on the received donation entry data; receiving, by the processor, entry certification data associated with the at least one donation entry, the entry certification data including an indication of certification associated with the at least one donation entry from at least one medical professional; based on acceptance of the entry certification data by the LPDP, approving, by the processor, the donation profile for hosting, wherein hosting the donation profile by the LPDP is based on the donation profile being approved for hosting.
further comprising: based on acceptance of the entry certification data by the LPDP, identifying, by the processor, the at least one loyalty program associated with the loyalty point type of the at least one donation entry; obtaining, by the processor, from the receiver, receiver loyalty account data associated with at least one receiver loyalty account associated with the identified at least one loyalty program; establishing at least one link between the donation profile and the at least one receiver loyalty account based on the obtained receiver loyalty account data, wherein hosting the donation profile by the LPDP is further based on establishment of at least one link between the donation profile and the at least one receiver loyalty account; and wherein sending the instruction to the donor loyalty program to transfer loyalty points to a receiver loyalty account associated with the donation profile of the receiver includes providing the donor loyalty program an identifier of the receiver loyalty account based on an established link between the donation profile and a receiver loyalty account associated with the donor loyalty program.
further comprising: based on a donated quantity of loyalty points to a donation entry of the at least one donation entry of the donation profile reaching the requested quantity of the donation entry, notifying, by the processor, the receiver and at least one donor that donated loyalty points to the donation entry that the requested quantity has been reached; and enabling, by the processor, the receiver to use the donated quantity of loyalty points based on the at least one donation entry.
wherein the donation profile of the receiver includes a donation deadline indicating a date upon which the requested quantity of loyalty points of the at least one donation entry is needed; and the computerized method further comprising: based on failing to reach the requested quantity of loyalty points of the at least one donation entry by the donation deadline, notifying, by the processor, the receiver and at least one donor that donated loyalty points to the donation entry that the requested quantity has not been reached before the deadline; and sending an instruction, by the processor, to the donor loyalty program to reverse the transfer of loyalty points from the receiver loyalty account to at least one loyalty account of the at least one donor that donated loyalty points to the donation entry.
further comprising: based on receiving, from the donor, the donation request, detecting, by the processor, a transaction initiated by the donor for which the donor accrues loyalty points of the loyalty point type; based on detecting the transaction, prompting, by the processor, the donor to donate the loyalty points accrued from the detected transaction to the donation profile of the receiver; and based on receiving an indication to donate the accrued loyalty points to the donation profile in response to the prompting, sending an instruction, by the processor, to the donor loyalty program to transfer the accrued loyalty points from the loyalty account associated with the loyalty account identifier to a receiver loyalty account associated with the donation profile of the receiver.

wherein hosting the donation profile includes sharing profile information of the donation profile on at least one social media platform identified by the receiver.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for hosting, by a processor of an LPDP, the donation profile of the receiver, wherein the donation profile includes at least one donation entry including a loyalty point type and a requested quantity, wherein the at least one donation entry has been approved by at least one loyalty program associated with the loyalty point type; exemplary means for receiving, by the processor, from the donor, a donation request to donate loyalty points to the hosted donation profile of the receiver, the donation request including at least a loyalty account identifier of a loyalty account of the donor, credential data associated with the loyalty account, and a point donation quantity indicating a quantity of loyalty points to be donated to the receiver, wherein the loyalty account is associated with a donor loyalty program of the at least one loyalty program associated with the loyalty point type; exemplary means for requesting, by the processor, approval of the donation request from the donor loyalty program, the requesting including providing the loyalty account identifier and the credential data to the donor loyalty program; and based on receiving approval of the donation request from the donor loyalty program, exemplary means for sending an instruction, by the processor, to the donor loyalty program to transfer a quantity of loyalty points indicated by the point donation quantity from the loyalty account associated with the loyalty account identifier to a receiver loyalty account associated with the donation profile of the receiver.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for enabling a donor to donate loyalty points associated with a loyalty program to a receiver, the system comprising:
at least one processor of a loyalty points donation platform (LPDP); and
at least one memory comprising computer program code, the at least one memory and the computer program code configured to, with the at least one processor, cause the at least one processor to:
receive a signed certificate from a physician that specifies a cause for creation of a donation profile, wherein the donation profile is created by the receiver, and the signed certificate is electronically signed by the physician;
validate the donation profile for posting, the validation including validating an electronic signature of the physician on the electronically signed certificate by the LPDP;
approve the donation profile by the LPDP before posting and receive an approval from at least one loyalty program based on the validation of the donation profile;

based on the approvals of the donation profile, post the donation profile, the donation profile including data from a certification form, the data including the signed certificate, by the physician, the signed certificate specifying the cause for creation of the donation profile and further certifying that expenses for which the receiver is requesting donation are associated with the specified cause, and display the donation profile on a graphical user interface (GUI), wherein the donation profile includes a loyalty point type based on the data in the certification form;

transmit the donation profile to particular users of one or more social media platforms over a computer network;

based on the transmitted donation profile, receive over the computer network, via a GUI, from the donor, a donation request to donate loyalty points to the posted donation profile of the receiver, the donation request including at least a loyalty account identifier of a donor loyalty account of the donor, credential data associated with the donor loyalty account, and a donation quantity indicating a quantity of loyalty points to be donated to the receiver, wherein the donor loyalty account is associated with a donor loyalty program;

request approval of the donation request from the donor loyalty program, wherein requesting the approval includes providing the loyalty account identifier and the credential data to the donor loyalty program, and wherein the donor loyalty account, that is associated with the donor loyalty program, verifies the donor based on the loyalty account identifier and the credential data enabling the approval; and based on receiving the approval of the donation request from the donor loyalty program, send over the computer network, an instruction to the donor loyalty program to transfer a quantity of loyalty points, indicated by the donation quantity, from the donor loyalty account to a receiver loyalty account associated with the donation profile of the receiver.

2. The system of claim 1, wherein the at least one memory and the computer program code are configured to, with the at least one processor, further cause the at least one processor to:

determine that with the transfer the quantity of loyalty points, indicated by the donation quantity, from the donor loyalty account to a receiver loyalty account, a goal of the receiver has been reached and notify the receiver that the goal of the receiver has been reached.

3. The system of claim 1, wherein the at least one memory and the computer program code are configured to, with the at least one processor, further cause the at least one processor to:

based on validation of the electronically signed certificate by the LPDP, identify the at least one loyalty program associated with the loyalty point type;

obtain, from the receiver, receiver loyalty account data associated with at least one receiver loyalty account associated with the identified at least one loyalty program;

establish at least one link between the donation profile and the at least one receiver loyalty account based on the obtained receiver loyalty account data, wherein posting the donation profile by the LPDP is further based on establishment of the at least one link between the donation profile and the at least one receiver loyalty account; and wherein sending the instruction to the donor loyalty program to transfer the quantity of loyalty points to the receiver loyalty account comprises providing the donor loyalty program an identifier of the at least one receiver loyalty account for transferring the quantity of loyalty points to the at least one receiver loyalty account linked to the donation profile.

4. The system of claim 1, wherein transmitting the donation profile to particular users of one or more social media platforms includes the receiver selecting the particular users.

5. The system of claim 1, wherein the donation profile of the receiver includes a donation deadline indicating a date by which the requested donation quantity of the loyalty points is needed; and wherein the at least one memory and the computer program code are configured to, with the at least one processor, further cause the at least one processor to:

based on failing to reach the requested donation quantity of loyalty points by the donation deadline, notify the receiver and the donor that the requested donation quantity has not been reached by the donation deadline; and send an instruction to the donor loyalty program to reverse the transfer of loyalty points from the receiver loyalty account to the donor loyalty account.

6. The system of claim 1, wherein the at least one memory and the computer program code are configured to, with the at least one processor, further cause the at least one processor to:

based on receiving, from the donor, the donation request, detect a transaction initiated by the donor for which the donor accrues loyalty points of the loyalty point type;

based on detecting the transaction, prompt the donor to donate the loyalty points accrued from the detected transaction to the donation profile of the receiver; and based on receiving an indication to donate the accrued loyalty points to the donation profile in response to the prompting, send an instruction to the donor loyalty program to transfer the accrued loyalty points from the donor loyalty account to the receiver loyalty account.

7. The system of claim 1, wherein the donation profile is associated with a loyalty program of the receiver and includes a loyalty account associated with the loyalty program of the receiver, a loyalty account identifier of the loyalty account, and credentials associated with the loyalty account identifier.

8. A computerized method for enabling a donor to donate loyalty points associated with a loyalty program to a receiver, the method comprising:

receiving a signed certificate from a physician that specifies a cause for creation of a donation profile, wherein the donation profile is created by the receiver, and the signed certificate is electronically signed by the physician;

validating the donation profile for posting, the validation including validating an electronic signature of the physician on the electronically signed certificate by a loyalty points donation platform (LPDP);

approving the donation profile by the LPDP before posting and receive an approval from at least one loyalty program based on the validation of the donation profile;

based on the approvals of the donation profile, posting, by a processor of the LPDP, the donation profile, the donation profile including data from a certification form, the data including the signed certificate, by the physician, the signed certificate specifying the cause for creation of the donation profile and further certifying that expenses for which the receiver is requesting donation are associated with the specified cause, and displaying the donation profile on a graphical user interface (GUI), wherein the donation profile includes a loyalty point type based on the data in the certification form;

transmitting the donation profile to particular users of one or more social media platforms over a computer network;

based on the transmitted donation profile, receiving over the computer network, via a GUI, by the processor, from the donor, a donation request to donate loyalty points to the posted donation profile of the receiver, the donation request including at least a loyalty account identifier of a donor loyalty account of the donor, credential data associated with the donor loyalty account, and a donation quantity indicating a quantity of loyalty points to be donated to the receiver, wherein the donor loyalty account is associated with a donor loyalty program;

requesting, by the processor, approval of the donation request from the donor loyalty program, the requesting including providing the loyalty account identifier and the credential data to the donor loyalty program, and wherein the donor loyalty account, that is associated with the donor loyalty program, verifies the donor based on the loyalty account identifier and the credential data enabling the approval; and based on receiving the approval of the donation request from the donor loyalty program, sending over the computer network, an instruction, by the processor, to the donor loyalty program to transfer a quantity of loyalty points indicated by the donation quantity from the donor loyalty account to a receiver loyalty account associated with the donation profile of the receiver.

9. The computerized method of claim 8, the method further comprising:
determining that with the transfer the quantity of loyalty points, indicated by the donation quantity, from the donor loyalty account to a receiver loyalty account, a goal of the receiver has been reached and notifying the receiver that the goal of the receiver has been reached.

10. The computerized method of claim 8, the method further comprising:
based on the validation of the electronically signed certificate by the LPDP, identifying, by the processor, the at least one loyalty program associated with the loyalty point type;
obtaining, by the processor, from the receiver, receiver loyalty account data associated with at least one receiver loyalty account associated with the identified at least one loyalty program;
establishing at least one link between the donation profile and the at least one receiver loyalty account based on the obtained receiver loyalty account data, wherein posting the donation profile by the LPDP is further based on establishment of the at least one link between the donation profile and the at least one receiver loyalty account; and
wherein sending the instruction to the donor loyalty program to transfer the quantity of loyalty points to the receiver loyalty account comprises providing the donor loyalty program an identifier of the at least one receiver loyalty account for transferring the quantity of loyalty points to the at least one receiver loyalty account linked to the donation profile.

11. The computerized method of claim 8, wherein transmitting the donation profile to particular users of one or more social media platforms includes the receiver selecting the particular users.

12. The computerized method of claim 8, wherein the donation profile of the receiver includes a donation deadline indicating a date by which the requested donation quantity of the loyalty points is needed; and
the computerized method further comprising:
based on failing to reach the requested donation quantity of loyalty points by the donation deadline, notifying, by the processor, the receiver and the donor that the requested donation quantity has not been reached by the donation deadline; and
sending an instruction, by the processor, to the donor loyalty program to reverse the transfer of loyalty points from the receiver loyalty account to the donor loyalty account.

13. The computerized method of claim 8, the method further comprising:
based on receiving, from the donor, the donation request, detecting, by the processor, a transaction initiated by the donor for which the donor accrues loyalty points of the loyalty point type;
based on detecting the transaction, prompting, by the processor, the donor to donate the loyalty points accrued from the detected transaction to the donation profile of the receiver; and
based on receiving an indication to donate the accrued loyalty points to the donation profile in response to the prompting, sending an instruction, by the processor, to the donor loyalty program to transfer the accrued loyalty points from the donor loyalty account to the receiver loyalty account.

14. The computerized method of claim 8, wherein the donation profile is associated with a loyalty program of the receiver and includes a loyalty account associated with the loyalty program of the receiver, a loyalty account identifier of the loyalty account, and credentials associated with the loyalty account identifier.

15. One or more non-transitory computer storage media having computer-executable instructions for enabling a donor to donate loyalty points associated with a loyalty program to a receiver via a loyalty points donation platform (LPDP) that, upon execution by a processor, cause the processor to at least:
receive a signed certificate from a physician that specifies a cause for creation of a donation profile, wherein the donation profile is created by the receiver, and the signed certificate is electronically signed by the physician;
validate the donation profile for posting, the validation including validating an electronic signature of the physician on the electronically signed certificate by the LPDP;
approve the donation profile by the LPDP before posting and receive an approval from at least one loyalty program based on the validation of the donation profile;
based on the approvals of the donation profile, post the donation profile, the donation profile including data from a certification form, the data including the signed certificate, by the physician, the signed certificate specifying the cause for creation of the donation profile and further certifying that expenses for which the receiver is requesting donation are associated with the specified cause, and display the donation profile on a graphical user interface (GUI), wherein the donation profile includes a loyalty point type based on the data in the certification form;

transmit the donation profile to particular users of one or more social media platforms over a computer network;

based on the transmitted donation profile, receive over the computer network, via a GUI, from the donor, a donation request to donate loyalty points to the posted donation profile of the receiver, the donation request including at least a loyalty account identifier of a donor loyalty account of the donor, credential data associated with the donor loyalty account, and a donation quantity indicating a quantity of loyalty points to be donated to the receiver, wherein the donor loyalty account is associated with a donor loyalty program;

request approval of the donation request from the donor loyalty program, wherein requesting approval includes providing the loyalty account identifier and the credential data to the donor loyalty program, and wherein the donor loyalty account, that is associated with the donor loyalty program, verifies the donor based on the loyalty account identifier and the credential data enabling the approval; and based on receiving the approval of the donation request from the donor loyalty program, send over the computer network, an instruction to the donor loyalty program to transfer a quantity of loyalty points indicated by the donation quantity from the donor loyalty account to a receiver loyalty account associated with the donation profile of the receiver.

16. The one or more non-transitory computer storage media of claim 15, wherein the computer-executable instructions, upon execution by a processor, further cause the processor to at least:

determine that with the transfer the quantity of loyalty points, indicated by the donation quantity, from the donor loyalty account to a receiver loyalty account, a goal of the receiver has been reached and notify the receiver that the goal of the receiver has been reached.

17. The one or more non-transitory computer storage media of claim 15, wherein the computer-executable instructions, upon execution by a processor, further cause the processor to at least:

based on acceptance of the electronically signed certificate by the LPDP, identify the at least one loyalty program associated with the loyalty point type;

obtain, from the receiver, receiver loyalty account data associated with at least one receiver loyalty account associated with the identified at least one loyalty program;

establish at least one link between the donation profile and the at least one receiver loyalty account based on the obtained receiver loyalty account data, wherein posting the donation profile by the LPDP is further based on establishment of the at least one link between the donation profile and the at least one receiver loyalty account; and wherein sending the instruction to the donor loyalty program to transfer the quantity of loyalty points to the receiver loyalty account comprises providing the donor loyalty program an identifier of the at least one receiver loyalty account for transferring the quantity of loyalty points to the at least one receiver loyalty account linked to the donation profile.

18. The one or more non-transitory computer storage media of claim 15, wherein the computer-executable instructions, upon execution by a processor, further cause the processor to at least:

based on a donated quantity of loyalty points to the donation profile reaching the requested donation quantity, notify the receiver and the donor that quantity of donated loyalty points has reached the requested donation quantity; and enable the receiver to use the donated quantity of loyalty points based on the notifying.

19. The one or more non-transitory computer storage media of claim 15, wherein the donation profile of the receiver includes a donation deadline indicating a date by which the requested donation quantity of the loyalty points is needed; and wherein the computer-executable instructions, upon execution by a processor, further cause the processor to at least:

based on failing to reach the requested donation quantity of the loyalty points by the donation deadline, notify the receiver and the donor that the requested donation quantity has not been reached by the donation deadline; and send an instruction to the donor loyalty program to reverse the transfer of loyalty points from the receiver loyalty account to the donor loyalty account.

20. The one or more non-transitory computer storage media of claim 15, wherein the computer-executable instructions, upon execution by a processor, further cause the processor to at least:

based on receiving, from the donor, the donation request, detect a transaction initiated by the donor for which the donor accrues loyalty points of the loyalty point type;

based on detecting the transaction, prompt the donor to donate the loyalty points accrued from the detected transaction to the donation profile of the receiver; and based on receiving an indication to donate the accrued loyalty points to the donation profile in response to the prompting, send an instruction to the donor loyalty program to transfer the accrued loyalty points from the donor loyalty account to the receiver loyalty account.

* * * * *